United States Patent [19]
Michahelles

[11] 3,874,308
[45] Apr. 1, 1975

[54] TRANSPORT APPARATUS
[76] Inventor: Michele Michahelles, 115 E. 90th St., New York, N.Y. 10028
[22] Filed: Jan. 15, 1974
[21] Appl. No.: 433,474

[52] U.S. Cl............................ 105/368 R, 214/38 R
[51] Int. Cl............................................. B61d 3/02
[58] Field of Search......... 296/1 A; 214/38 R, 38 D, 214/85; 105/368 R, 368 B; 104/20, 28, 29

[56] References Cited
UNITED STATES PATENTS

| | | |
|---|---|---|
| 3,285,194 | 11/1966 | Clejan............................ 105/368 R |
| 3,557,712 | 1/1971 | Milenkovic..................... 105/368 R |
| 3,785,514 | 1/1974 | Forsyth et al............... 105/368 R X |

Primary Examiner—M. Henson Wood, Jr.
Assistant Examiner—Gene A. Church
Attorney, Agent, or Firm—Brumbaugh, Graves, Donohue & Raymond

[57] ABSTRACT

Comfortable, safe, rapid, low-cost transport of persons over both relatively short and relatively long distances is provided by transport apparatus comprising small, self-propelled vehicles that are used primarily for short distance transportation and mobile carrier vehicles, such as railroad cars, which carry a number of the vehicles on a platform for long distance transportation. The passenger compartments of the self-propelled vehicles accommodate the passengers during transport on the mobile carrier vehicle, but the passengers in each vehicle have access to an enclosure, such as a corridor or passageway running longitudinally along the carrier vehicle and having doorways that match the doorways of the individual self-propelled vehicles so that the passengers may move to other places in the mobile carrier vehicle. The body of each of the self-propelled vehicles has a medial passage extending generally parallel to the direction the vehicle moves when self-propelled along a straight path and has an entry-exit doorway axially aligned with the medial passage such that the self-propelled vehicle is driven onto the mobile carrier vehicle transversely and docks at a selected doorway leading to the carrier vehicle enclosure. Seating is arranged on either side of the medial passage, the floor of the seating areas being at an elevation above the floor of the medial passage. Luggage space is provided above the seating areas and under the side portions of the floor between the wheels. The passage of the self-propelled vehicle is preferably approximately six feet in height so that a person can move about in the self-propelled vehicle with ease.

10 Claims, 13 Drawing Figures

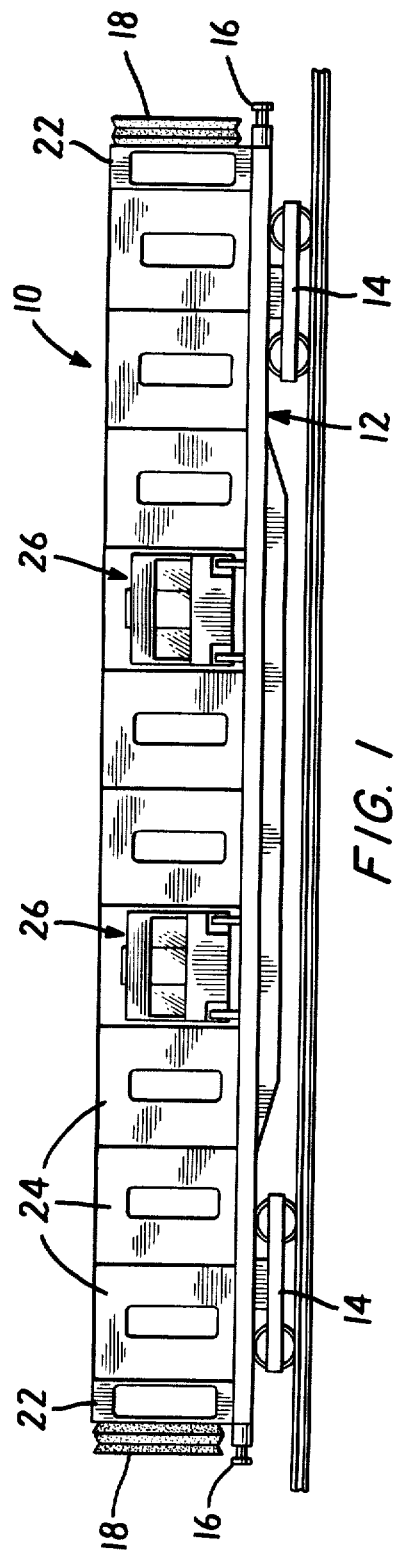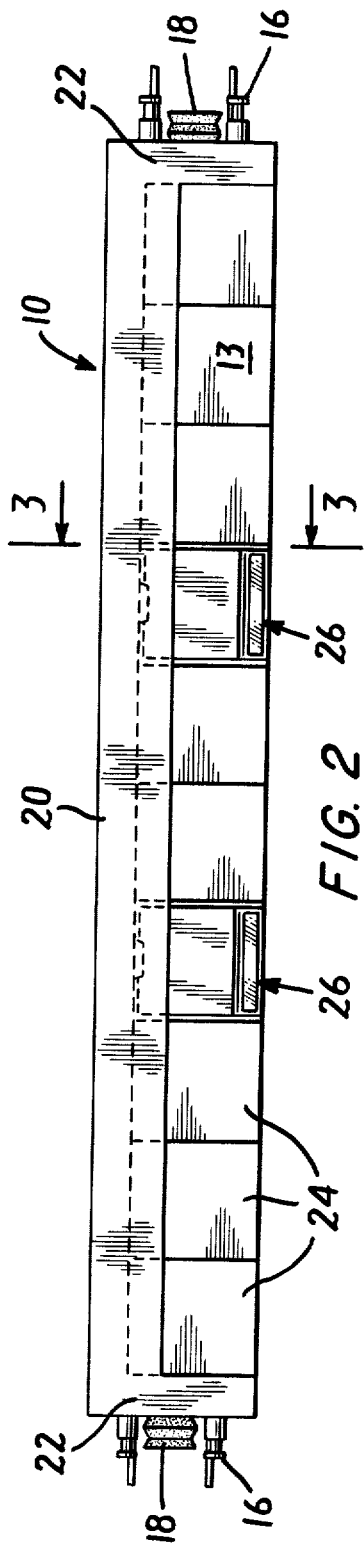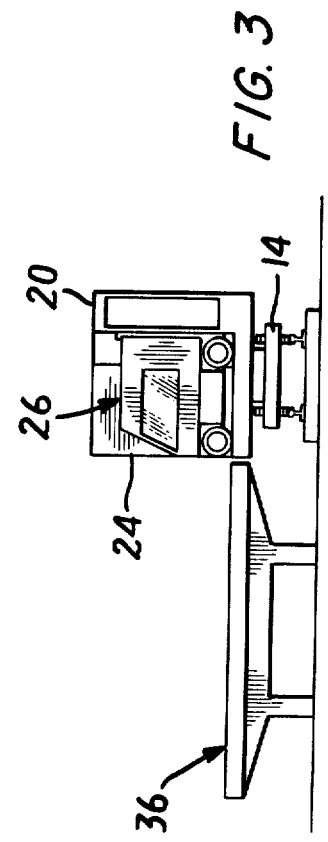

3,874,308

TRANSPORT APPARATUS

BACKGROUND OF THE INVENTION

As of this writing, political and economic circumstances have created a worldwide shortage of energy, a situation commonly referred to as "the energy crisis." Among the many serious consequences of the energy crisis is a shortage of fuel for use in transportion. Over recent years, the amount of energy consumed in transportation has increased tremendously, principally as a result of greatly increased use, worldwide, of personal automobiles. Not only have the number of automobiles increased, but the per mile rate of consumption of energy of individual automobiles has also increased to the point that a standard United States made automobile consumes on the order of twice as much fuel per mile as a standard automobile of, say, the 1950's. The relatively higher costs of gasoline have tended to make relatively smaller, more economical vehicles popular outside of the United States, but even foreign made automobiles have tended toward greater size, more luxury and higher fuel consumption.

Although many countries of the world have relied and continue to relay heavily on public transport, particularly railroads, public transportation in the United States has declined considerably over the years in favor of the automobile, but only a great costs in terms of fuel consumption, other economic aspects, safety and, frequently, comfort. It has become increasingly evident, as automobile traffic has increased, that the trend toward personal automobiles and away from public transportation must be halted or reversed due not only to shortages of fuel and other economic factors but to overcrowding of the highways, increasing numbers of accidents, and the adverse effects of automobile exhaust on air pollution.

Even if the present gasoline shortage is resolved on a short term basis, the trend toward a shift to sources of energy other than gasoline seems to be the trend for the next 10 years. This trend will provide forms of power more suitable for rail transportation, primarily electricity, rather than for automobiles.

Among the many factors that have resulted in the trend away from public transportation to personal use automobiles are the advantages of convenience, insofar as the automobile is available at will to an individual to take him anywhere he wishes to go, and of privacy, as contrasted with the limitations of scheduled public transportation between fixed terminal locations in large vehicle compartments carrying many people with little privacy. The foregoing and other aspects of a personal use automobile offer important advantages and a strong force against producing reliance upon public transportation and maintaining a system based predominantly on automobile transport. Moreover, the tremendous investments in highway systems, in the automobile industry and the extent to which the automotive industry is integrated into the economy, not only of the United States but other parts of the world, strongly warrants retention of personal use vehicles to as great an extent as possible. On the other hand, problems of air pollution, energy shortages, personal safety and other factors are going to require new approaches to transportion.

SUMMARY OF THE INVENTION

There is provided, in accordance with the present invention, a transportation systems based on personal use vehicles that are very much shorter than any vehicle presently available and yet constructed to provide comfortable accommodation of four or five passengers and a substantial amount of luggage. Because of the small size of the vehicle, it is very light in weight and therefore can be powered by a small engine that creates relatively little pollution and is very economical to operate. The transportation system of the invention further comprises a mobile carrier vehicle having an elongated platform for transporting a number of the self-propelled vehicles. The mobile carrier vehicle is preferably a rail car, but the invention is not limited to rail cars as a carrier vehicle of the system. For example, the principles of the invention are applicable to ships, trucks and other relatively large-sized vehicles.

The mobile carrier vehicle has an enclosure that is located laterally adjacent the platform and ordinarily is elongated along the axis along which the carrier vehicle moves, the enclosure including longitudinally spaced-apart doorways opening onto the platform, the bottom edges of the doorways being substantially above the platform. The self-propelled vehicles are positioned on the platform for transport and are releasably secured in position on the platform in a position in which a doorway on each of the vehicles communicates with a doorway of the enclosure of the carrier vehicle. Each self-propelled vehicle has a body that defines an enclosed compartment and includes a medial passage that extends parallel to the direction the vehicle moves when it is travelling along a straight path. An entry-exit doorway, preferably the sole entry-exit doorway of the vehicle, is aligned axially with the passage. Thus, the vehicle is driven into position on the platform of the carrier vehicle along a straight path running transversely to the longitudinal axis of the platform and is docked with its doorway in position for communication with a doorway of the enclosure of the carrier vehicle. The areas around the communicating doorways of the self-propelled vehicles and of the passageway of the carrier vehicle are preferably arranged to provide a seal for environmental isolation of the self-propelled vehicles and the enclosure on the carrier vehicle from the outside.

The self-propelled vehicles are constructed to be useful primarily for relatively short-distance travel, say trips of up to 100 miles. When the vehicle user wishes to be transported a greater distance, he drives his self-propelled vehicle to a nearby station served by carrier vehicles and onto the platform of a carrier vehicle going to or toward his destination. A latching system on the carrier vehicle secures the self-propelled vehicle in place. The doorways between his self-propelled vehicle and the enclosure on the carrier vehicle afford him access to other facilities associated with the carrier vehicle. For example, in a preferred embodiment of the transportation system in which the carrier vehicles are rail cars, a train comprising a number of the carrier vehicles and more or less conventional dining cars, bar cars, and the like enable the occupants of self-propelled vehicles carried on the rail cars to move about on the train for the use of restrooms, dining car facilities, bar car facilities, and so forth. However, an important advantage of the system is that the occupants of the self-propelled vehicles normally remain in the self-propelled vehicles throughout the trip on the carrier vehicle. When he arrives at or near his destination, he drives off the carrier vehicle at a station and can drive about locally at will.

The construction of the self-propelled vehicles, according to the invention, preferably includes a medial passage or aisle approximately six feet in height so that the occupants of the vehicle may move about relatively freely. Seating is located on raised portions of the vehicle floor on either side of the aisle portion. The seating may be constructed to provide substantial versatility of arrangement, for example, by permitting seats to be moved into different positions, to be converted into beds and otherwise to be made more comfortable and convenient for a long trip. Certain seats can be removed for increased luggage capacity, and a collapsible table can be provided for the use of the occupants during the trip. Environmental conditions can be maintained by equipment associated with the carrier vehicle or by equipment in the self-propelled vehicle powered from electrical or other power sources. The system is well-suited for the use of battery-powered electric motors as the driving engine of the self-propelled vehicles, since the vehicles are small and light in weight. The batteries can be recharged from chargers on the carrier vehicle while the self-propelled vehicles are being transported. Ample storage space can be provided in the areas above the seating on either side of the center aisle and beneath the side portions of the floor between the wheels. The overhead storage facilities provide great convenience for the occupants of the self-propelled vehicle during trips aboard a carrier vehicle.

As mentioned previously, an important feature of the invention is the location of an entry-exit doorway at either the front or rear end of the vehicle, preferably at the rear end for reasons of visibility from the driver's position. Such a location of the vehicle doorway enables convenient docking of the vehicle to the doorway of the carrier vehicle enclosure, for example, the enclosed lengthwise passageway on a rail car. Such a docking arrangement in a transverse direction across the carrier vehicle makes possible individual docking and undocking of vehicles without the need to move any other vehicles, in contrast to positioning of vehicles with the axes along which they move parallel to the axis of the carrier vehicle. Moreover, it makes possible loading from platforms laterally adjacent the carrier vehicle without the need for disconnecting the carrier vehicle from other vehicles in a train.

Another advantage of the transportation system of the invention is that it can be constructed on the basis of present day technology and placed in immediate use. Thus, the vehicles may be made of sufficiently short overall length to be accommodated on a platform of a standard size rail car. The engine, drive train and other elements of the self-propelled vehicle are well within the state of the art.

For a further understanding of the invention, reference may be made to the following description of exemplary embodiments considered in conjunction with the accompanying drawings.

DESCRIPTION OF THE DRAWINGS

FIG. 1 is a side elevational view of a rail car constructed as a carrier vehicle and carrying self-propelled vehicles, the drawing being essentially schematic;

FIG. 2 is a top view of the carrier vehicle and self-propelled vehicles of FIG. 1;

FIG. 3 is a cross-sectional view, generally of schematic form, showing a carrier vehicle in place adjacent a platform for driving the self-propelled vehicles on and off the rail car;

DESCRIPTION OF EXEMPLARY EMBODIMENT

Figure 4:
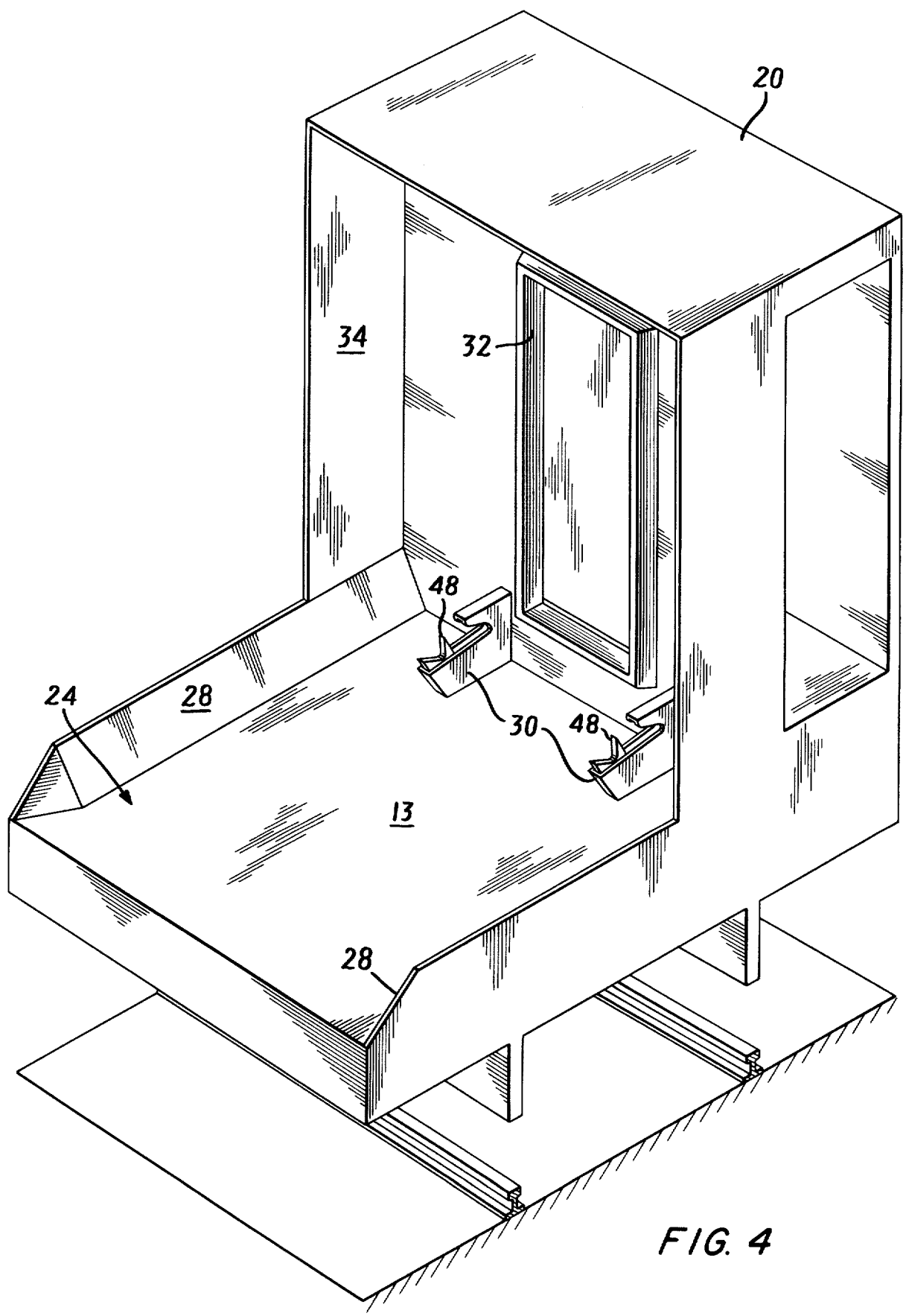
FIG. 4 is a schematic illustration of one self-propelled vehicle station on a rail car of the type illustrated in FIGS. 1 to 3.

In a preferred embodiment of the invention, a carrier vehicle is based upon a generally conventional rail car chassis 10 having a suitable floor framing system 12, a floor or platform 13, spaced-apart trucks 14, one at each end, and an appropriate coupling (not shown), buffers 16 and a matable platform and enclosure extension 18 (sometimes called a frame door) at each end. In accordance with the invention, the basic rail car chassis is provided with a longitudinally extending enclosure or passageway 20, the passageway 20 being located along one side of the floor 13, extending along the entire length of the car and terminating in transverse portions 22, one of which is located at each end of the car. The lateral portions 22 of the passageway accommodate movement of the passengers from car to car via the frame doors.

The platform 13 of the rail car 10 is subdivided into a number of identical positions or stations 24, each of which is equipped to receive for transport on the rail car a self-propelled vehicle, two of which are illustrated in position on the rail car in FIGS. 1 and 2, as identified in the drawings generally by the numeral 26. The self-propelled vehicles 26 are described in greater detail below. A typical station 24 of the rail car is illustrated in FIG. 4. The floor 13 of the car is equipped with laterally spaced-apart guide elements 28 for guiding the self-propelled vehicles into proper position by engagement with the wheels of the vehicle. For example, the guideways may, as illustrated in FIG. 4, be inclined curb formations positioned on the platform. The particular guide arrangement might also involve channels or trackways recessed into or extending up from the platform or any other appropriate guide arrangement. Each station 26 further includes a latching mechanism 30 constructed to secure the self-propelled vehicle into position at the station and a doorway 32 entering the longitudinal passageway 20. As an optional, but desirable feature, each station 26 further includes a canopy 34 extending laterally out over a portion of the platform from the passageway enclosure for protection from the environment of the doorway 32 and the latching mechanism 30. The canopy 34 tends to limit intrusion of rain and snow into the areas of the doorway 32 and latching mechanism 30 and substantially to eliminate problems due to icing.

Figure 5:
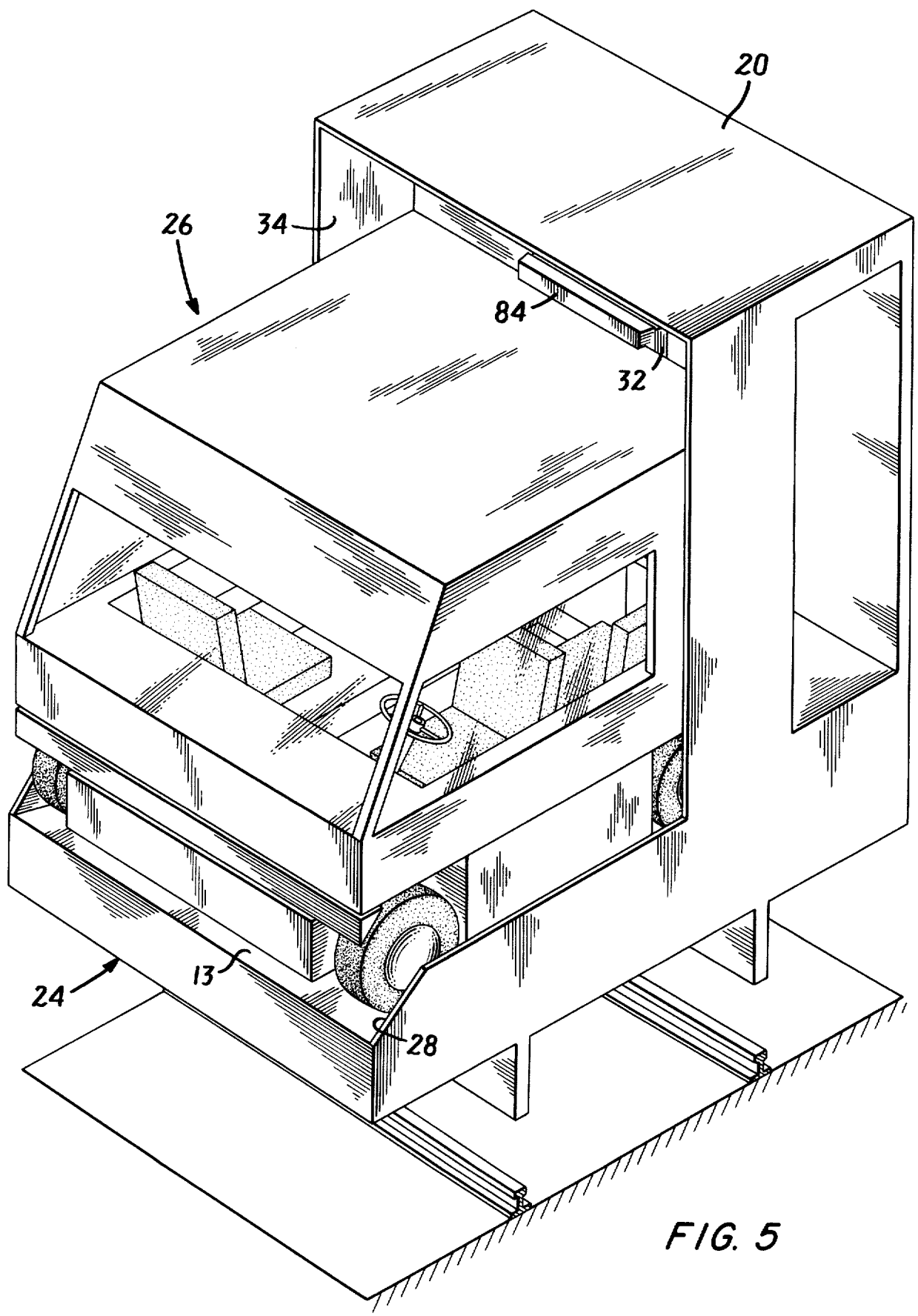
FIG. 5 is a pictorial view, also fragmentary and schematic, of a station of the rail car with a self-propelled vehicle in position at the station.

Referring to FIG. 5 of the drawings, which illustrates a typical vehicle station of the rail car with a self-propelled vehicle in place, the vehicle is driven onto the platform of the rail car from an appropriate roadway or platform 36 (see FIG. 3) located at a station served by the railroad. Each open station of the rail car is readily accessible to a vehicle, and the vehicle is conveniently and easily driven into position by backing it up onto the rail car platform, the guideways or curbs 28 assisting in properly positioning the vehicle at the station 26.

An exemplary form of latching mechanism at each station (see FIGS. 6 to 8 of the drawings) is operated automatically as the vehicle backs into position. More particularly, the vehicle has a transverse latch bar 40 rigidly secured to the rear portion of the vehicle frame. Spaced-apart tandem assemblies of essentially identical construction include fixed members 42 that have a forwardly opening tapered slot 44 and movable members 46 having generally V-shaped locking surfaces 48 at their extremities. The movable members 46 are pivoted at pivot connections 50 on the fixed members and are coupled to compression elements, such as springs 54. As the self-propelled vehicle nears the rearward extreme position at the station, the latching bar 40 engages the surface 48 on the movable member 46, pivots it in a clockwise direction (as shown in FIG. 6), compressing the spring in the process and ultimately attains a latched position, which is shown in solid lines in FIG. 6, in which the latching bar 40 is locked in position between the fixed member 42 and the movable member 46 of each assembly of the tandem latching mechanism 30.

Figure 6:
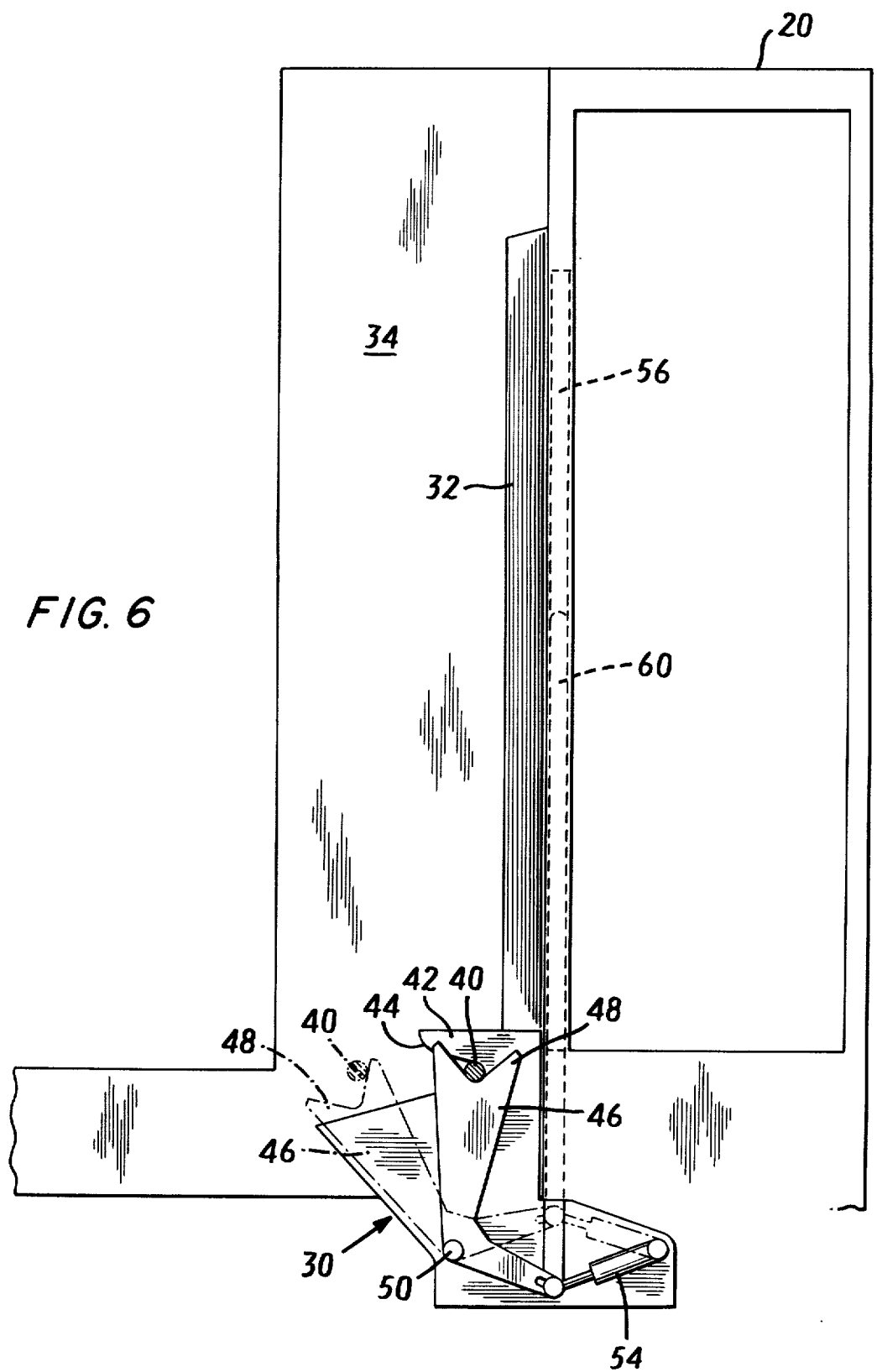
FIG. 6 is an elevational view taken in a direction perpendicular to the axis of a rail car and illustrating an exemplary form of latching mechanism for securing a vehicle in position on the rail car.
Figure 7:
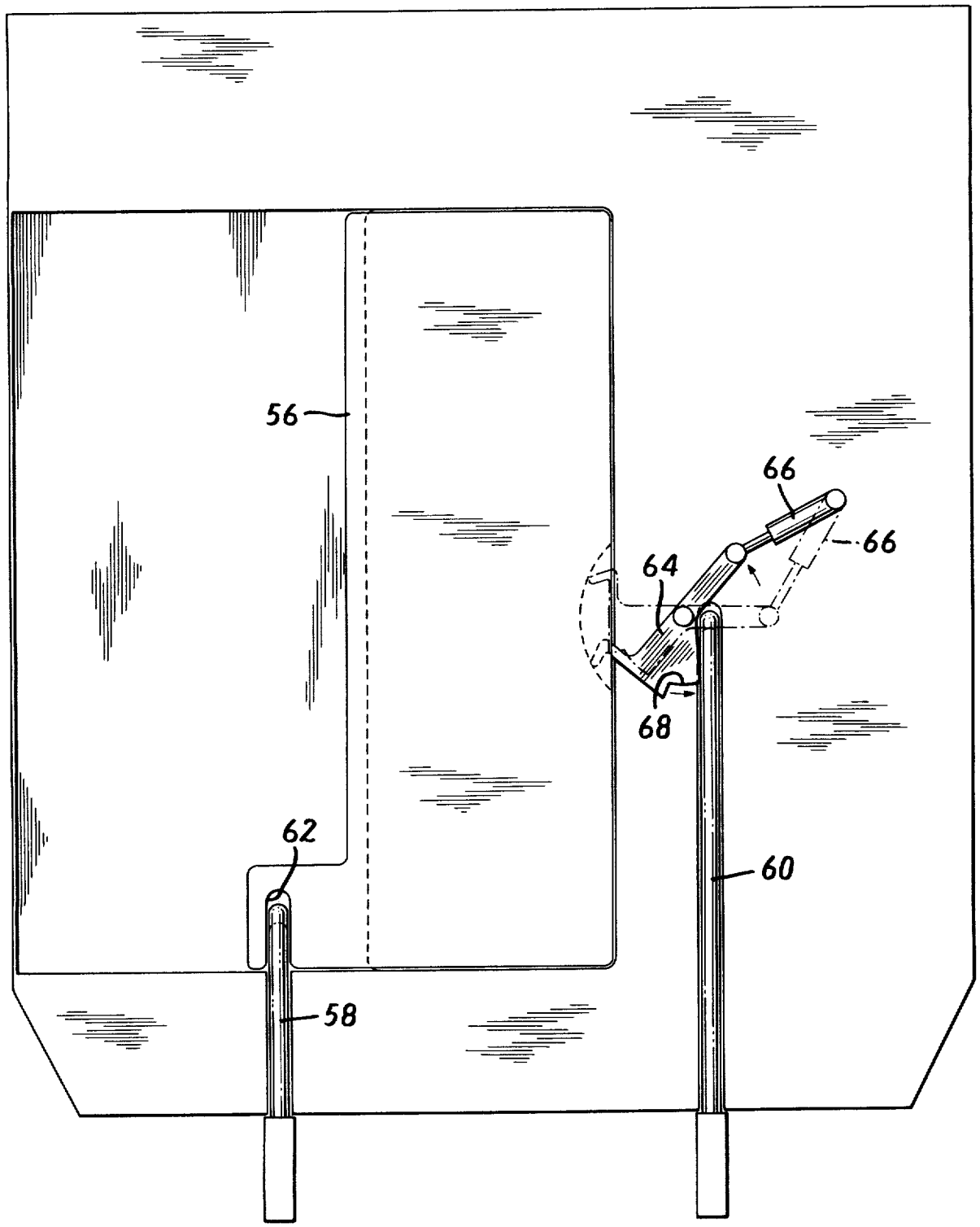
FIG. 7 is a side elevational view of a station on a rail car and showing another portion of the latching mechanism of FIG. 6 in one position.
Figure 8:
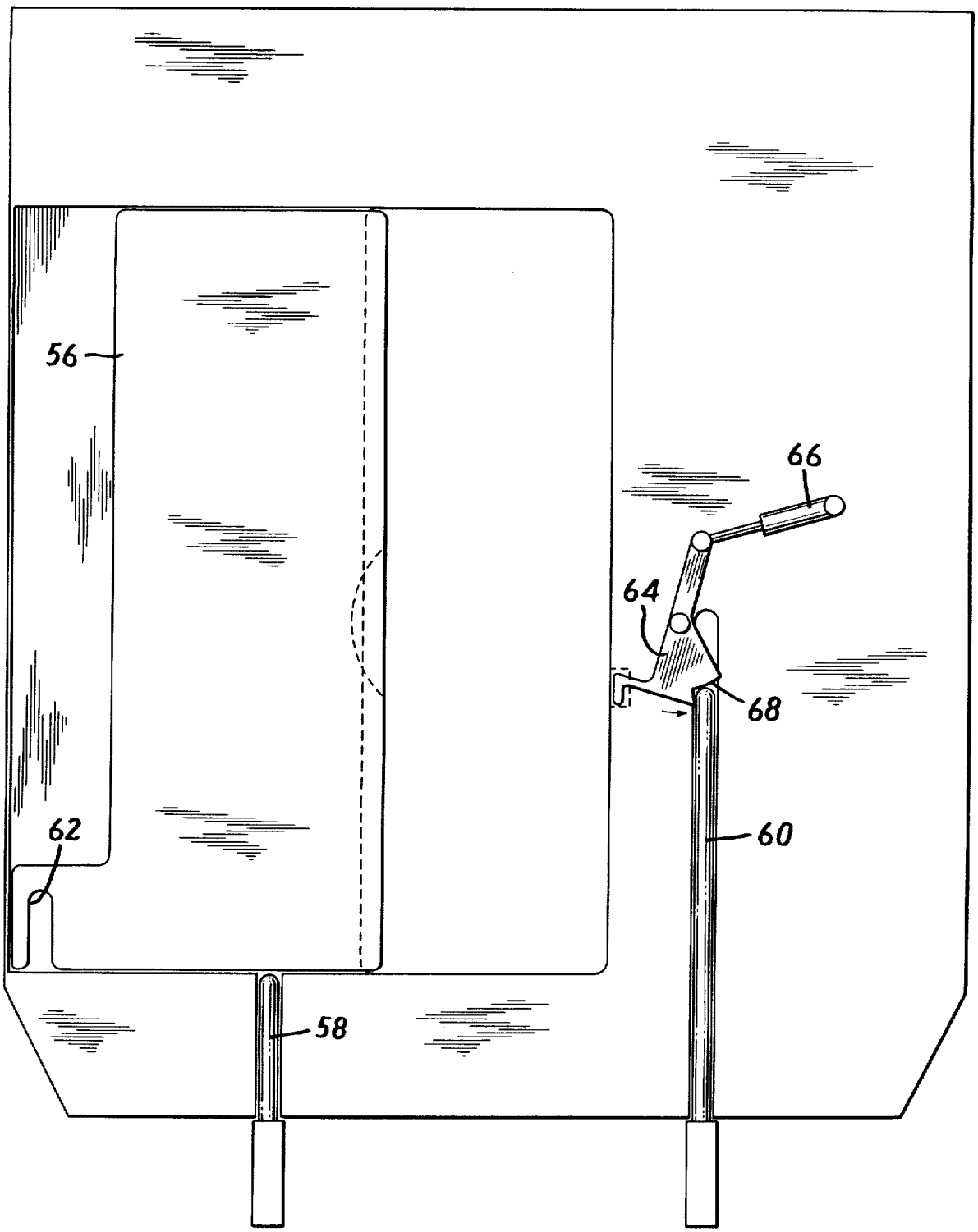
FIG. 8 is a view similar to FIG. 7 but showing another position of the latching mechanism.

The latch mechanism of FIGS. 6 to 8 further includes, referring particularly to FIGS. 7 and 8, a door release and lock mechanism for locking the latch mechanism when the vehicle is secured in position and at the same time permitting the door to be opened. On the other hand, the locking mechanism is constructed to release the latch mechanism to permit a vehicle to move away from anchored position on the rail car be actuation of an associated operating mechanism. The locking mechanism also secures a door 56 in closed position in the doorway leading to the passageway whenever a vehicle is not properly latched in position on the rail car, thus providing a safety interlock that prevents a door 56 from being opened unless a vehicle is in position on the platform at a given station.

The locking mechanism (see particularly FIGS. 7 and 8) comprises, in association with each of the latch assemblies of the latch mechanism 30 (not shown in FIGS. 7 and 8), a locking bar 58, 60 that is movable vertically between an upper position, FIG. 7, and a lower position, FIG. 8. When a vehicle is driven off the station on the rail car, the mechanism being appropriately conditioned to permit the vehicle to be driven away, the latch bar 40 on the vehicle pulls the movable member 46 of each latch assembly forward, thereby moving it into the position illustrated in dotted lines in FIG. 6. When the movable member 46 is in the dashed line position of FIG. 6, both of the locking bars 58 and 60 are raised to their upper position. The locking bar to the left in FIG. 7 is received in a locking slot or hole 62 formed on a lateral extension of the door 56, thereby preventing the door from being opened whenever there is no vehicle in latched position on the rail car platform. Similarly, the right locking bar, which is substantially longer, is shifted upwardly into the position shown in FIG. 7 in which a locking lever 64 is held in a position illustrated by solid lines in FIG. 7 by a spring element 66, the locking element 64 being a pivoted member having camming surfaces 68 (described below) and constituting an operating device that is actuated by the occupants of the vehicle to prepare the latching and locking mechanisms for release of the vehicle when it is to be driven away. In the upper position of the bar 60 and with the locking levers 64 in the position illustrated in solid lines in FIG. 7, the latching mechanism 30 and the locking bars 58 and 60 are positioned for receiving a vehicle at the station, the door 56 being held closed by the bar 58 and the locking lever 64 being positioned to be driven in a counter-clockwise direction, as shown in FIG. 7 by the spring element 66. When a vehicle is driven into position at the station, as described above, the pivoting of the members 46 of each of the locking assemblies pulls the locking bars 58 and 60 downwardly, thereby permitting the door 56 to be opened, since the locking bar 58 drops below the hole or slot 62 in the door (see FIG. 8), and also allows the locking lever 64 to pivot further in a counter-clockwise direction under the force of the spring element 66 into a position bringing the cam surface 68 into position for engagement by the upper end of the bar 60, thereby to prevent the bar 60 from being moved upwardly as long as the locking lever 64 remains in the position illustrated in FIG. 8. Both latching assemblies of the latching mechanism 30 are held in securely locked position with the latching bar of the vehicle captured by the latching assembly (as shown in solid lines in FIG. 6), the left bar being prevented from moving upwardly upon opening of the door 56 and the right bar 60 being prevented from moving upwardly by the camming surface 68 on the locking lever 64. Inasmuch as the two bars 58 and 60 are in their downward positions, the movable member 46 of each latching assembly (see FIG. 6) is restrained in the locked position shown in solid lines in FIG. 6, thereby preventing the vehicle from being released.

When the train arrives at a station that is the destination of the passengers of a given self-propelled vehicle, an occupant of the self-propelled vehicle actuates the locking lever 64 by pivoting it clockwise (see FIGS. 7 and 8) out of the position illustrated in FIG. 8 into the position illustrated in dotted lines in FIG. 7. The clockwise rotation of the locking lever moves the camming surface 68 out of position blocking upward movement of the bar 60, the lever 64 being held in the position illustrated in dashed lines in FIG. 7 by the spring element 66. The vehicle occupant then closes the passageway door 56 so that the hole or slot 62 is aligned with the bar 58 and can receive the bar and allow the latch mechanism to release the vehicle. In the position illustrated in dashed lines in FIG. 7, the latching mechanism and locking mechanism are in condition for release of the vehicle, and the vehicle are in condition for release of the vehicle, and the vehicle may be driven off the platform with the mechanisms in the condition just described. When the vehicle is driven away from the station, the movable member of each of the latching assemblies is pulled forward into the dotted line position illustrated in FIG. 6, thereby shifting the latch bar 58 up into the slot or hole 62 in the door 56 and moving the locking bar 64 into the position shown in solid lines in FIG. 7. Accordingly, the locking bar is armed in readiness automatically to shift into the position shown in FIG. 8 for locking the bar 60 in a down position when another vehicle is driven into position at the station.

The latching and locking mechanisms described above and illustrated in FIGS. 6 to 8 of the drawings are, of course, merely exemplary of a latch mechanism for securing the self-propelled vehicles in place on the railway car platform for transport. Various mechanical, electrical, pneumatic and hydraulic latching mechanisms controlled in various ways, for example, by central control from the cab of a locomotive, are well within the ordinary skill of the art. With any system, including the one shown in FIGS. 6 to 8, it is desirable to provide an interlock with a central control point that prevents the latch mechanism from being released under any circumstances while the train is in motion and permitting vehicles to be released to be driven off the rail cars only when the train is stopped in proper position at a station. Similarly, a suitable control interlock that prevents the train from moving out of the station until all vehicles are properly positioned and latched on the railway cars is highly desirable and can be provided within the ordinary skill of the art.

Referring now to FIGS. 9 to 13 of the drawings, a self-propelled vehicle has a number of important characteristics making it appropriate for the transportation system according to the invention. For one thing, the self-propelled vehicle is preferably much shorter than any automobile presently marketed, at least when, as contemplated for presently existing railroad equipment, the self-propelled vehicles are constructed to fit into the maximum width limit of a rail car. Thus, the overall length of a self-propelled vehicle in the transportion system according to the present invention should be on the order of seven feet nine inches, or thereabouts, so that when a vehicle is docked at a station on the railway car the overall width of the car (i.e., the length of the vehicle plus the overall outside width of the passageway 20) does not exceed approximately 10 feet 8 inches. Although the other dimensions of the vehicle are of lesser importance, it is appropriate to consider the vehicle as being a passenger compartment providing as much comfort and convenience as possible to the occupants, not so much for use in the self-propelled configuration for relatively short-length travel, but especially for long duration occupancy on relatively longer trips. Thus, the height of the passenger compartment defined by the body of the vehicle is preferably such as to provide approximately 6 feet or more head room along a center aisle portion and appropriate lesser heights appropriate to accommodate passengers in seating arranged on either side of the medial aisle. The width of the vehicle is also of lesser importance, although it is desirable under the present design parameters of the highway systems to not exceed a width of approximately 6 feet 10 inches.

In addition to the dimensional characteristics of the vehicle, the configuration of the body is important, particularly the provision of an aisle for convenient movement of the occupants into and out of the vehicle and from place to place within the vehicle that extends substantially parallel to the axis along which the vehicle moves when travelling in a straight line, that is, lengthwise of the vehicle. Preferably, the aisle is located centrally in the body in the lateral direction. The body also has an entry-exit doorway that is aligned with the aisle and is therefore located in either the front or rear wall of the vehicle, preferably the rear (primarily for reasons of visibility through the front of the vehicle and the likelihood that the engine of the vehicle will be located in the front). It is, however, within the scope of the invention to provide a doorway in the front of the vehicle and to locate the engine compartment at the rear of the vehicle.

Figure 12:
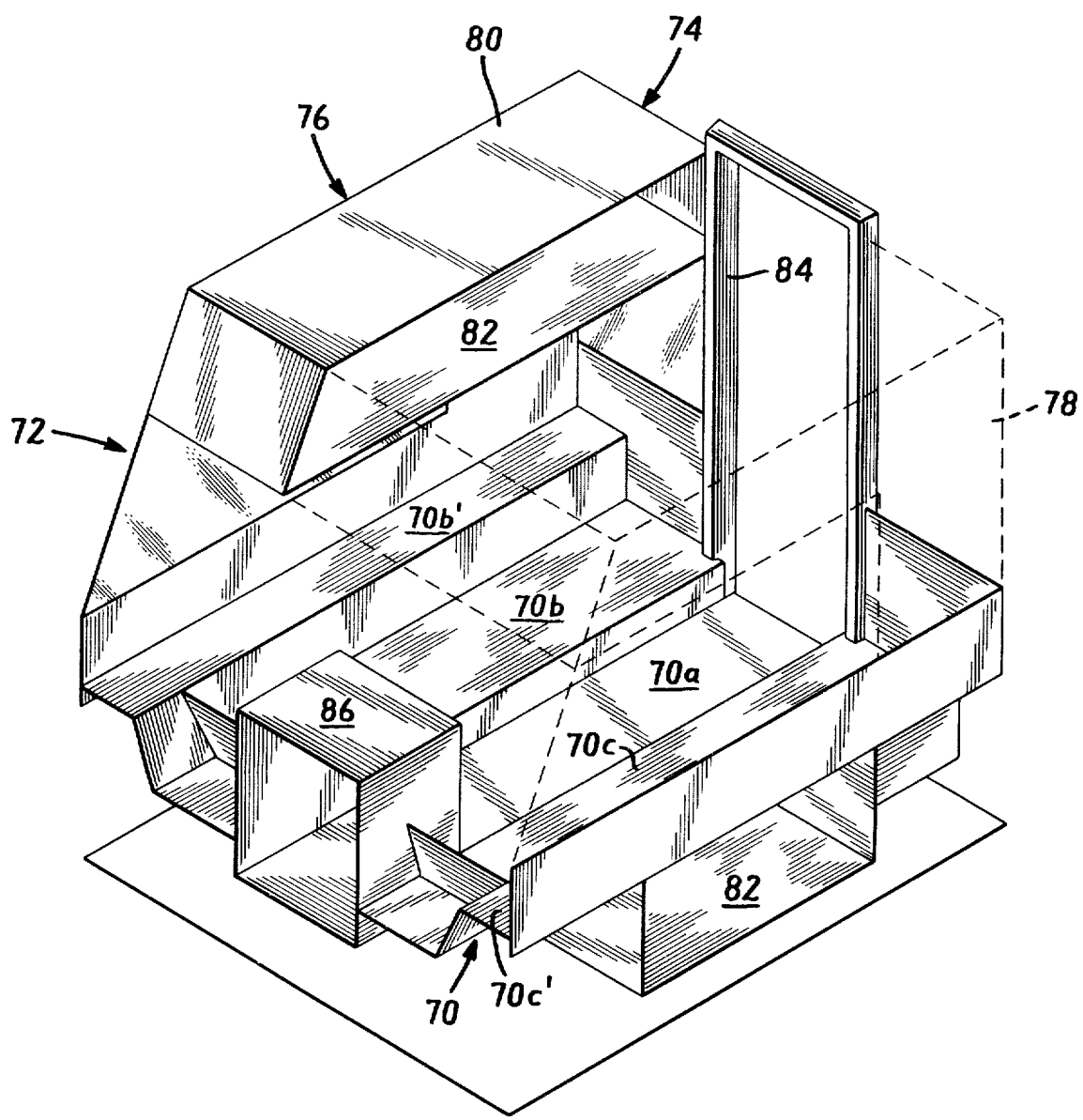
FIG. 12 is a schematic illustration of the basic geometry of the basic self-propelled vehicle body, portions being shown in phantom to permit clearer illustration of the foremat of the floor.

The general overall configuration of an exemplary embodiment of the vehicle body is illustrated schematically in FIG. 12. The body includes a floor 70 having a medial portion 70a that constitutes the floor of the longitudinal aisle of the vehicle and portions 70b and 70c on either side of the aisle portion 70a that are located above the aisle, say a few inches, and that constitute the bases for the seating in the vehicle. The seating portions 70b and 70c of the vehicle body floor preferably include a step some distance in from the laterally outermost edges of the floor, the steps being indicated by the reference numerals 70b' and 70c' which, at their fore and aft extremities, constitute wheel housings located generally at each corner of the vehicle body. The front wall 72, rear wall 74 and side walls 76 and 78 extend upwardly from generally the outermost perimeter of the floor 70 to define the lateral enclosures for the body, and a roof 80 joined at the upper edges of the body walls completes the enclosure. In view of the substantial height of the vehicle compartment, there is ample space above the seating areas and on both sides of the aisle for the location of luggage and storage compartments, for example, the compartment 82 illustrated in FIG. 12, a similar compartment being located on the other side of the vehicle but not being illustrated in the drawings for reasons of clarity of illustration. Additional luggage and storage compartments may be located under the lateral portions 70b' and 70c' of the floor between the wheels (not shown in FIG. 12), one such compartment 82 being illustrated on the near side of the schematic drawing (FIG. 12). A doorway 84 is located at the rear end of the aisle 70a, the door extending substantially the full height of the vehicle body and an appropriate door, such as a sliding door or a door that is hinged and opens inwardly, being provided in the doorway but not being shown in FIG. 12. The doorway 84 is, preferably, the sole entry-exit opening of the vehicle, thereby permitting the vehicle sides to be made very strong for safety. One or more of the vehicle side windows may be constructed as emergency exits. As a matter of convenience, a door can, of course, be provided at the front of the left side of the vehicle. An enclosure 86 for the engine and drive systems of the vehicle are located at the lower portion of the front of the vehicle body and are represented schematically by the box identified by the reference numeral 86. The specific structural and design characteristics of the body are a matter of ordinary engineering skill, and they may readily be accomplished within the ordinary skill of the art to conform to the overall configuration represented in FIG. 12 and described above.

Figure 13:
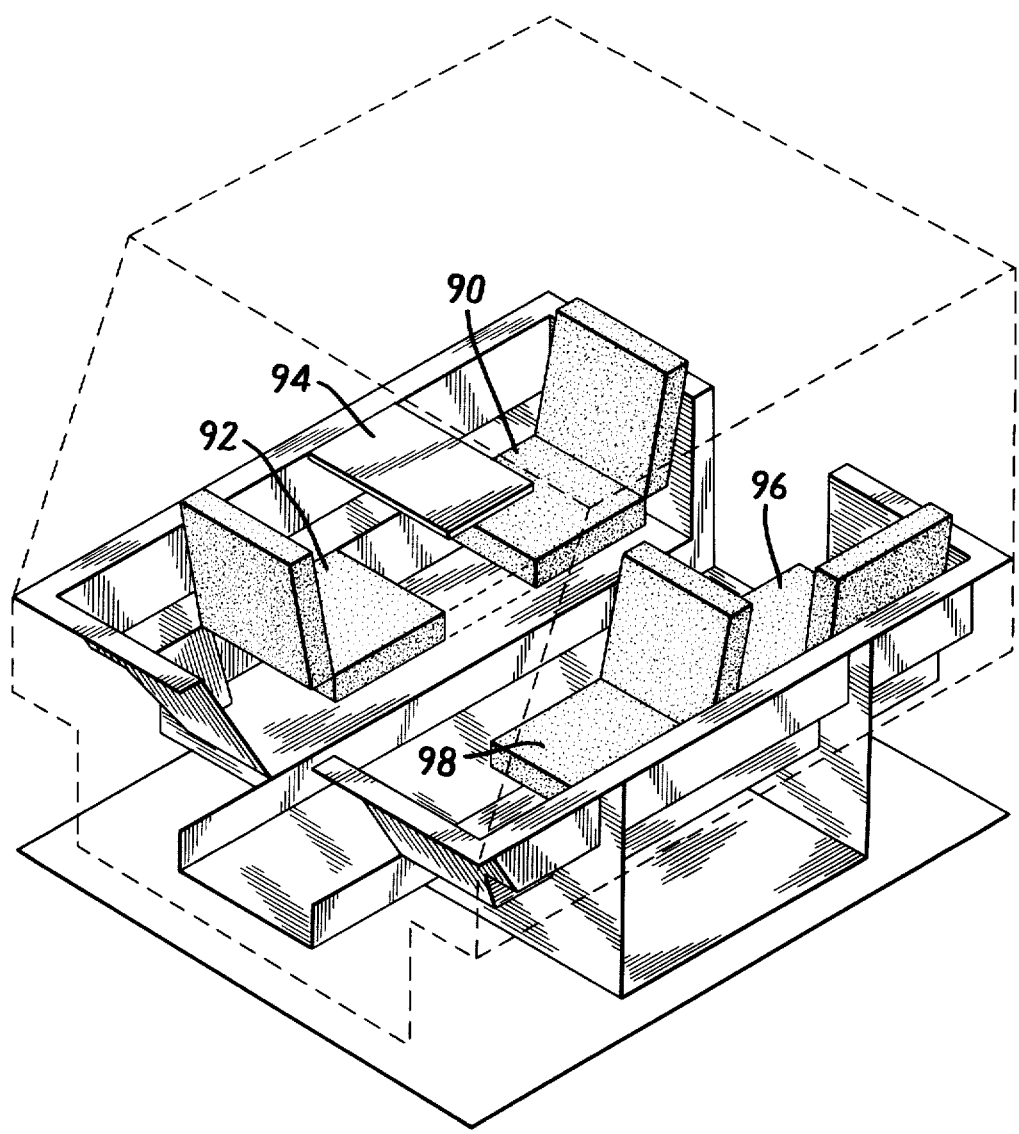
FIG. 13 is another schematic pictorial view of a vehicle illustrating an exemplary seating arrangement.

The above-described vehicle body that defines the passenger compartment is susceptible of various arrangements of seating, an exemplary arrangement being shown in FIG. 13. Moreover, the system is amenable to the use of convertible seating that can be moved about and changed in configuration, for example, by changing the positions of the seats from forward facing to either side or rear facing, converting the seating into beds, the provision of a movable table and the like.

Referring to FIG. 13, the seating on the right side of the vehicle comprises, for example, a rear forward facing seat 90, a front rearward facing seat 92, the seats 90 and 92 being placed a convenient distance apart, and a removable table 94 being appropriately bracketed from the side wall of the vehicle.

The left side of the vehicle includes a side facing rear seat 96 and a front seat 98 for the driver. Appropriate arrangements can be constructed into the seating elements and their mountings to facilitate changing the positions of the seats to suit the desires of the passengers. In view of the foregoing, it will be understood, of course, that the seating arrangement depicted in FIG. 13 is merely exemplary of a variety of possible arrangements.

Figure 9:
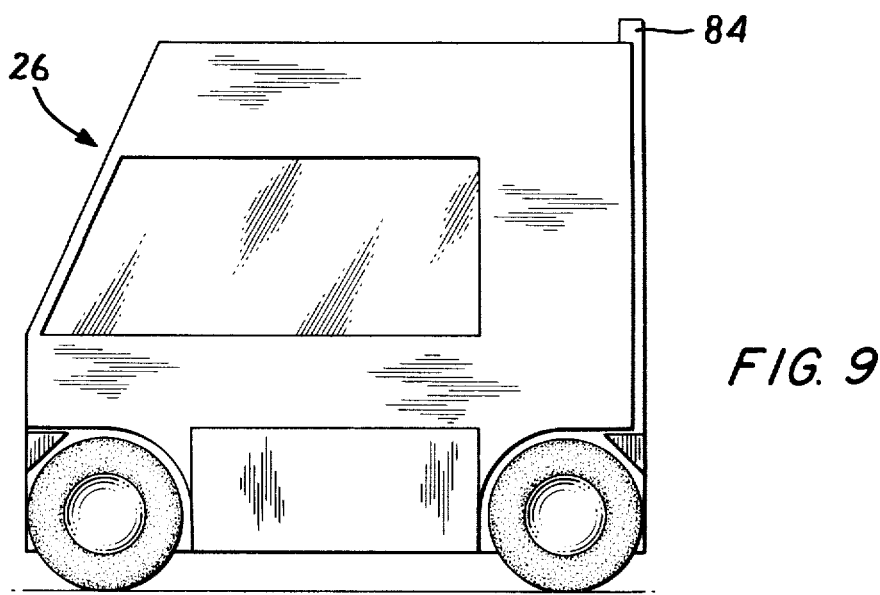
FIG. 9 is a side elevational view of generally schematic form depicting the self-propelled vehicle.
Figure 10:
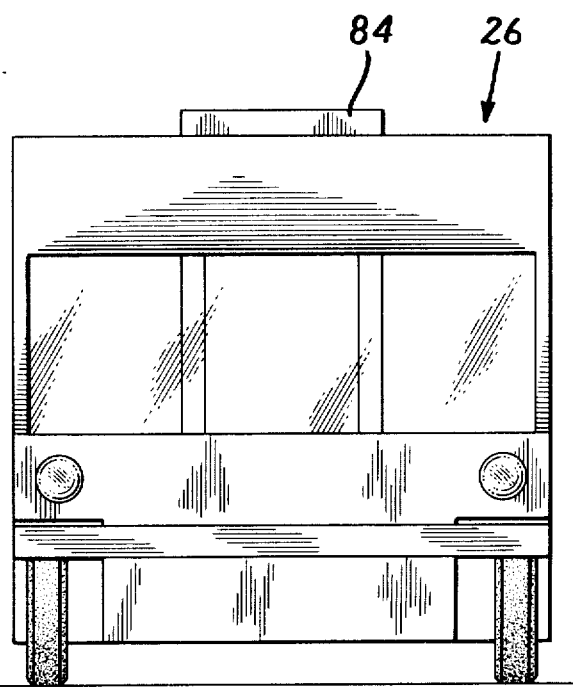
FIGS. 10 and 11 are front and rear views, respectively, of a vehicle.
Figure 11:
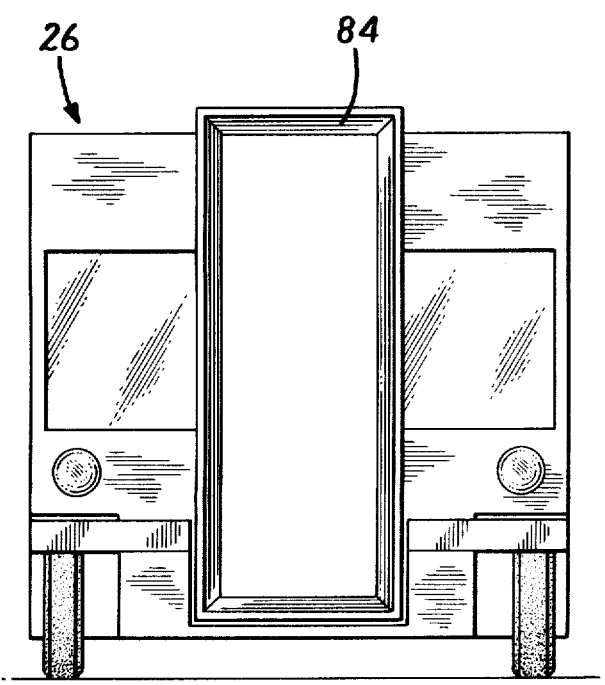

FIG. 9 to 11 illustrate the exterior of a vehicle from a primarily conceptual viewpoint. A variety of aesthetic treatments of the vehicle body will, of course, be readily conceived and developed within the framework of the overall configuration of the vehicle as described herein. Thus, no effort has been made in the presentation of FIGS. 9 to 11 to introduce aesthetic aspects into the vehicle, FIGS. 9 to 11 being exemplary of the overall configuration of the vehicle from a conceptual point of view. As illustrated in FIGS. 9 to 11, windows in the front, sides and rear of the vehicle, headlights, taillights, and other lighting, bumpers, which may be retractable to reduce overall length when the vehicle is transported on a carrier, and extending for self-propulsion, grilles and the like are provided on the basic body for the operation, convenience and safety of the vehicle and its acceptability as a self-propelled vehicle for road travel.

The chassis of the vehicle will be based on the current state of the art at a time in question. For example, front-mounted, front-driven drive engine and drive trains are presently well-known and used in a number of commercially available automobiles. Such a system is advantageous in the practice of the present invention since it is probably the best way to provide for the medial aisle or passage in the vehicle compartment by locating prime vehicle systems that occupy relatively substantial space entirely in the front of the vehicle. The basic approach, however, of locating power and transmission systems in a concentrated area can be equally applied to the rear of the vehicle, in which case a front entry would be provided. The more common drive arrangement of a front-mounted engine and rear wheel drive are, however, also appropriate for the vehicle. The relatively small size of the vehicle makes possible minimizing the amount of space required for the small engines, transmissions and drive trains necessary for the vehicle. Engine power requirements may be minimized, moreover, by reason of the lack of a need for high speed capability, say about 60 m.p.h., since the vehicle is intended primarily for local transport.

A further desirable feature of the invention is to provide for an appropriate sealing arrangement between the self-propelled vehicle and the enclosure of the carrier vehicle. In the embodiment illustrated in the drawings, the external part of the framework of the doorway 84 is constructed, dimensioned to match or mate to the exterior frame of each door 32 (FIG. 4) on the railway car passageway 20, and appropriate seals (not shown) are provided for air and water tightness. When a self-propelled vehicle is backed into docked and secured position on the railway car platform 14, the exterior of the door 84 of the self-propelled vehicle will mate in sealing relation to the exterior frame of the door 32 on the railway car passageway. In another appropriate arrangement, not shown, resilient, compressible gaskets, bellows or the like may be provided to extend around the perimeter of the entire rear wall of the vehicle. Such sealing systems can be mounted on the self-propelled vehicle, the carrier vehicle enclosures, or both, and may vary considerably in design while still providing the end function and result of an air and water tight mating of doorways.

The vehicle is well suited for docking at an entry to a residence, store, office, factory or other facility in the same manner as on a rail car or other carrier vehicle. The nature of the vehicle as a comfortable compartment with full headroom, seating, table, beds, and storage makes it very useful for habitation for purposes other than transport. For example, it can serve as a den, office or bedroom when docked to a residence, as an office or conference room when docked to an office building, or as a work area at a factory. The large interior volume makes the vehicles very useful for transport of goods.

The above-described embodiments of the invention are intended to be merely exemplary, and numerous variations and modifications may be made by those skilled in the art without departing from the spirit and scope of the invention. All such variations and modifications are intended to be included within the scope of the invention as defined in the appended claims.

I claim:

1. Transport apparatus comprising a mobile carrier vehicle having an elongated platform and an enclosure laterally adjacent and extending above the platform, the enclosure including longitudinally spaced-apart doorways opening onto the platform, the bottom edges of the doorways being substantially above the platform and at least two self-propelled vehicles positioned on the platform for transport on the carrier vehicle, each self-propelled vehicle having a body defining an enclosed compartment, and having a medial passage in the compartment extending generally parallel to the direction the vehicle moves when self-propelled along a straight path and having an entry-exit doorway generally axially aligned with the passage, and means releasably securing each self-propelled vehicle on the platform of the carrier vehicle in a position in which the doorway of each self-propelled vehicle communicates with a doorway of the enclosure of the carrier vehicle.

2. Transport apparatus according to claim 1 and further comprising means associated with the carrier vehicle for guiding each respective self-propelled vehicle into a position establishing relative positions for communication of the doorway of the self-propelled vehicle with the corresponding doorway of the carrier vehicle passage.

3. Transport apparatus according to claim 1 and further comprising means forming a seal between a portion of the enclosure of the carrier vehicle and a portion of the self-propelled vehicle, the seal environmentally isolating the communicating doorways.

4. Transport apparatus according to claim 1 wherein the carrier vehicle is a railway car, and wherein the enclosure extends parallel to the longitudinal axis of the railway car along the length of one side of the platform and has a height and width defining a passageway for movement on the railway car of occupants of the self-propelled vehicles.

5. Transport apparatus according to claim 1 wherein each doorway of the enclosure of the carrier vehicle and the doorway of each self-propelled vehicle substantially match and are substantially in register.

6. Transport apparatus according to claim 1 wherein the body of each self-propelled vehicle includes a floor having a medial aisle portion extending substantially the entire length of the compartment and laterally spaced side portions on either side of the aisle portion at an elevation substantially above the aisle portion, a front wall, and two side walls extend upwardly from adjacent the perimeter of the floor and defining a generally vertical peripheral lateral enclosure of the compartment, a top supported adjacent its perimeter on the walls, the top having a medial portion spaced above the aisle portion of the floor to provide a longitudinally generally medial passage in the vehicle in which a person can move fore and aft through the compartment with ease, and as the sole entry-exit for the compartment a single door aligned substantially axially of the aisle portion of the floor, the door being of a height not substantially less than the height of the medial passage.

7. Transport apparatus according to claim 6 wherein the compartment further includes seating, the seating being located exclusively in the space above the side portions of the floor and outboard from the passage to leave the passage unobstructed.

8. Transport apparatus according to claim 7 wherein the body of the self-propelled vehicle further includes luggage storage and carrying receptacles located above the seating and laterally outboard of the passage.

9. Transport apparatus according to claim 7 wherein the body of the self-propelled vehicle further includes on at least one side of the body under the side portion of the floor on that side a luggage and carrying enclosure, the fore and aft extremities of the enclosure being spaced from the front and back of the body to leave spaces for wheels.

10. Transport apparatus according to claim 6 wherein the door of the self-propelled vehicle is in the back wall of the body.

* * * * *